United States Patent
Wan et al.

(10) Patent No.: US 7,652,977 B2
(45) Date of Patent: *Jan. 26, 2010

(54) HYBRID AUTOMATIC REPEAT REQUEST COMBINING METHOD IN ORTHOGONAL FREQUENCY DIVISION MULTIPLEXING SYSTEM

(75) Inventors: Yan Wan, Shanghai (CN); Liyu Cai, Shanghai (CN); Pengpeng Song, Shanghai (CN)

(73) Assignee: Alcatel, Paris (FR)

( * ) Notice: Subject to any disclaimer, the term of this patent is extended or adjusted under 35 U.S.C. 154(b) by 698 days.

This patent is subject to a terminal disclaimer.

(21) Appl. No.: 10/884,969

(22) Filed: Jul. 7, 2004

(65) Prior Publication Data

US 2005/0007948 A1    Jan. 13, 2005

(30) Foreign Application Priority Data

Jul. 8, 2003    (CN) ................. 03 1 41448

(51) Int. Cl.
*H04J 11/00* (2006.01)

(52) U.S. Cl. ............... 370/208; 370/343; 370/465; 370/480; 714/746

(58) Field of Classification Search ............ 370/208, 370/252, 343, 480, 465; 714/746
See application file for complete search history.

(56) References Cited

U.S. PATENT DOCUMENTS

| | | | | |
|---|---|---|---|---|
| 2002/0110138 | A1* | 8/2002 | Schramm | 370/430 |
| 2003/0217319 | A1* | 11/2003 | Tripathi et al. | 714/751 |
| 2003/1021731 | * | 11/2003 | Tripathi et al. | 714/751 |
| 2004/0001555 | A1* | 1/2004 | Taffin et al. | 375/261 |
| 2004/0184398 | A1* | 9/2004 | Walton et al. | 370/203 |
| 2007/0162811 | A1* | 7/2007 | Matsumoto | 714/749 |

OTHER PUBLICATIONS

Strinati E. C., et al.: "Performance evaluation of some hybrid ARQ schemes in IEEE 802.11a networks," VTC 2003-Spring, The 57th. IEEE Semiannual Vehicular Technology Conference. Proceedings. Jeju Korea, Apr. 22-25, 2003, IEEE Vehicular Technology Conference, New York, NY, IEEE, US vol. 4 of 4, conf. 57, Apr. 22, 2003m pp. 2735-2739, XP010862359.

Harvey B. A., et al.: "Packet combining systems based on the Viterbi decoder" Military Communications Conference, 1992, MILCOM 92, Conference Record, Communications—Fusing Command, Control and Intelligence, IEEE San Diego, CA, USA Oct. 11-14, 1992, New York, NY, USA IEEE, US, Oct. 11, 1992, pp. 757-762, XP010060922.

Atarashi H., et al.: "An Efficient ARQ Scheme for Multi-Carrier Modulation Systems Based on Packet Combining" IEICE Transactions on Communications, Communications Society, Tokyo, JP, vol. E82-B, No. 5, May 1999, pp. 731-739, XP000940234.

* cited by examiner

*Primary Examiner*—Seema S Rao
*Assistant Examiner*—Sai-Ming Chan
(74) *Attorney, Agent, or Firm*—Sughrue Mion, PLLC

(57) ABSTRACT

The present invention provides a HARQ (Hybrid Automatic Repeat Request) combining method in an OFDM (Orthogonal Frequency Division Multiplexing) system, which adopts improved Chase combining method weighted by SNR and variance of SNR to realize HARQ combining. The method can improve system performance in processing power and time delay, particularly in low SNR environment, and will not make the system more complex.

12 Claims, 4 Drawing Sheets

HYBRID AUTOMATIC REPEAT REQUEST COMBINING METHOD IN ORTHOGONAL FREQUENCY DIVISION MULTIPLEXING SYSTEM

CROSS-REFERENCE TO RELATED APPLICATION(S)

This application is based on the Chinese Patent Application No. 03141448.6 filed on Jul. 8, 2003, the disclosure of which is hereby incorporated by reference thereto in its entirety, and the priority of which is hereby claimed under 35 U.S.C. §119.

FIELD OF THE INVENTION

The present invention generally relates to a mobile communication system, and particularly to a HARQ (Hybrid Automatic Repeat Request) combining method in an OFDM (Orthogonal Frequency Division Multiplexing) system.

BACKGROUND OF THE INVENTION

Existing simple combining techniques use Chase combining weighted by SNR (signal-to-noise ratio) to realize HARQ combining. Here, SNR is an average value over a period of time (for example, a data frame).

There are two cases in relatively low SNR environment: 1) variance of SNR may be relatively high over the same period of time; 2) variance of SNR may be relatively low over the same period of time. The first case indicates that time selective fading of the signal is very serious. The effect of fast fading in time domain may be neglected and the performance of HARQ combining at the receiver side may be reduced if only Chase combining weighted by SNR is simply adopted to realize HARQ combing.

SUMMARY OF THE INVENTION

The object of the present invention is to provide a HARQ combining method in an OFDM system, which can solve problems existing in the prior art, improve system performance in throughput and time delay, and reduce the system retransmission times at the same time.

The HARQ combining method in an OFDM system according to the present invention comprises the following steps:

a. A transmitter transmitting data to a receiver in a unit of frame, then the receiver weighting the received data based on its SNR and variance of SNR and storing the weighted data as final data in a buffer of a HARQ combining unit, and later, the receiver processing the stored final data to determine whether the received data frames are correct;

b. If the data frames are correct, the receiver outputting the final data and feeding back an ACK indicator respectively to the HARQ combining unit of the receiver and the transmitter, and if the data frames are not correct, the receiver feeding back a NACK indicator respectively to the HARQ combining unit of the receiver and the transmitter;

c. When the HARQ combining unit of the receiver and the transmitter receives an ACK indicator, the process returning to step a, until all data has been transmitted;

d. When the HARQ combining unit of the receiver and the transmitter receives a NACK indicator, the transmitter retransmitting original data to the receiver, then the HARQ combining unit of the receiver weighting the received retransmission data based on its SNR and variance of SNR, and combining the weighted retransmission data with the data stored in the buffer of the HARQ combining unit, and at the same time, storing the combined data as final data in the buffer of the HARQ combining unit, then the receiver processing the combined final data to determine whether the combined data frames are correct, and returning to step b.

In step a, before the transmitter transmits data to the receiver in a unit of frame, the data needs to undergo some processes including CRC appending, encoding and OFDM modulating in turn, and at the same time storing the data after CRC appending and before encoding in a TX buffer as final data in order to facilitate possible retransmission. In step a, before the receiver weights the received data based on its SNR and variance of SNR, the receiver has to OFDM-demodulate the received data. In step a, the receiver processes the stored final data, including in turn soft decoding and CRC checking, and then obtaining an ACK or NACK indicator based on the determining whether the received data is correct by CRC checking.

In step b, the ACK or NACK indicator fed back to the transmitter is inputted to the TX buffer. When said TX buffer receives an ACK indicator, it will store new data as final data in itself, whereas when said TX buffer receives a NACK indicator, it will hold original final data unchanged.

In step d, before the HARQ combining unit of the receiver weights the received retransmission data based on its SNR and variance of SNR, the receiver has to OFDM-demodulate the received retransmission data. In step d, the receiver SNR-estimates the OFDM-demodulated retransmission data to obtain its SNR and variance of SNR. In Step d, the receiver processes the combined final data, including in turn soft decoding and CRC checking, and then obtaining an ACK or NACK indicator based on the determining whether the combined data frames are correct by CRC checking.

Here, in the receiver of the present invention, the processes for weighting the received data and weighted combining the retransmission data can be realized according to the following formula:

$$\begin{cases} R(i) = \dfrac{\sum_{i=0}^{N_{retrans}} s(i) * \dfrac{\text{SNR\_est}(i)}{\sigma_{SNR}(i)}}{\sum_{i=0}^{N_{retrans}} \dfrac{\text{SNR\_est}(i)}{\sigma_{SNR}(i)}}, & \text{SNR\_est}(i) < SNR_{threshold} \text{ and } \sigma_{SNR}(i) > \sigma_{threshold} \\[2em] R(i) = \dfrac{\sum_{i=0}^{N_{retrans}} s(i) * \text{SNR\_est}(i)}{\sum_{i=0}^{N_{retrans}} \text{SNR\_est}(i)}, & \text{SNR\_est}(i) \geq SNR_{threshold} \text{ or } \sigma_{SNR}(i) \leq \sigma_{threshold} \end{cases}$$

where i indicates the i-th retransmission, and $i \geq 0$;
$N_{retrans}$ indicates the retransmission times of a transmission block, and $1 \leq N_{retrans} \leq N_{max}$;
$N_{max}$ indicates the maximum retransmission times of a transmission block;
R(i) indicates the data after the i-th combining;
S(i) indicates the data before the i-th combining;
SNR_est(i) indicates SNR of the i-th estimation;
$SNR_{threshold}$ indicates the threshold of SNR;
$\sigma^2_{SNR}(i)$ indicates variance of SNR of the i-th estimation;
$\sigma^2_{threshold}$ indicates the threshold of variance of SNR.

The receiver in the OFDM system of the present invention comprises:

a SNR estimation unit for SNR-estimating the demodulated data to obtain estimated SNR and variance of SNR and outputting them;

a HARQ combining unit for receiving the output from the SNR estimation unit, weighting inputted demodulated data based on inputted SNR and variance of SNR, and storing the weighted data as final data in a buffer of said HARQ combining unit, then determining whether to execute the combining based on determining whether the received data frames are correct: if the received data frames are correct, not executing the combining; if the received data frames are not correct, weighting the inputted demodulated retransmission data based on its SNR and variance of SNR, and combining the weighted retransmission data with the data stored in the buffer of said HARQ combining unit and storing the combined data as final data in the buffer of said HARQ combining unit.

The present invention implements a hybrid automatic repeat request combining method in an OFDM system by means of improved Chase combining weighted by SNR and variance of SNR. The method improves system performance in throughput and time delay, particularly in low SNR environment, and will not make the system more complex.

BRIEF DESCRIPTION OF THE DRAWINGS

The present invention will now be further described in combination with the attached drawings and exemplary embodiments of the present invention.

DESCRIPTION OF THE PREFERRED EMBODIMENTS

With reference to the attached drawings and preferred embodiments, the present invention will now be further described.

Figure 1:
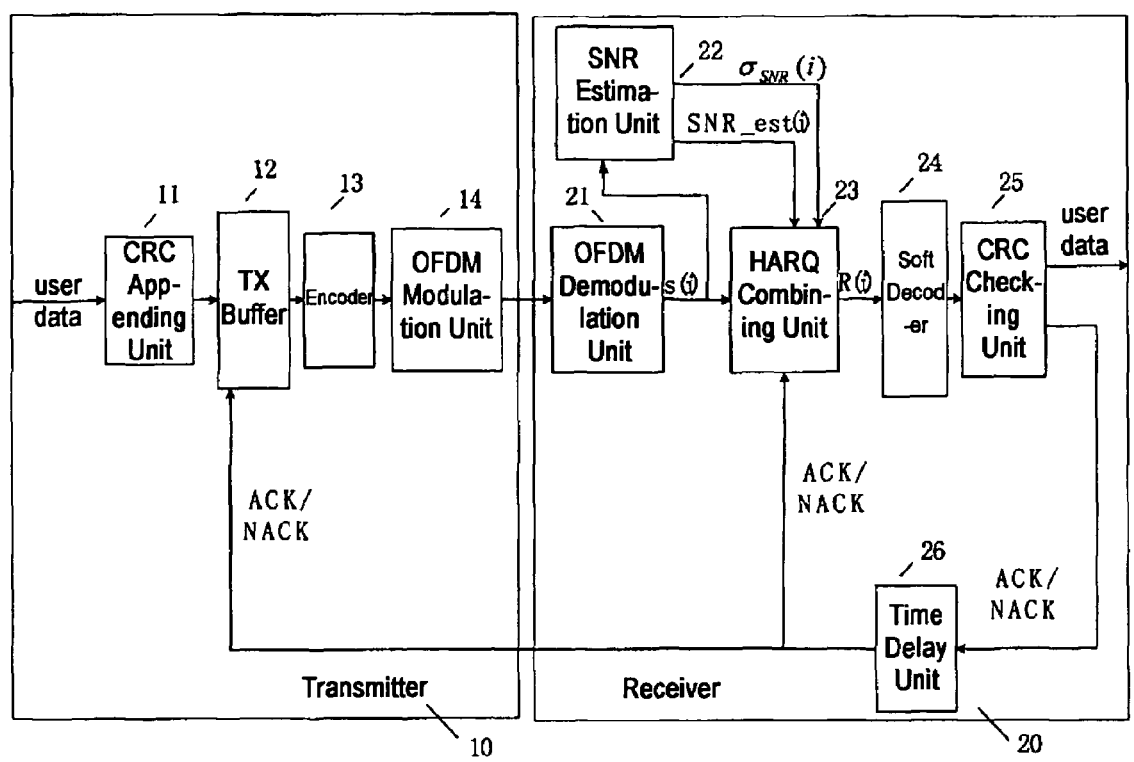
FIG. 1 is a schematic illustrating relevant structure of the receiver and transmitter for performing the HARQ combining method of the present invention in an OFDM system.

FIG. 1 is a schematic illustrating related structure of the receiver and transmitter for performing the HARQ combining method of the present invention in an OFDM system. As shown in FIG. 1, at the side of Transmitter 10, firstly, CRC Appending Unit 11 of Transmitter 10 appends CRC to inputted user data in unit of frame and stores the appended user data with CRC bit as final user data in TX Buffer (transmitter buffer) 12. Then, TX Buffer 12 transmits the stored user data to Encoder 13, which encodes the user data inputted from TX Buffer 12 and outputs the result to OFDM Modulation Unit 14. And later, OFDM Modulation Unit 14 transmits the OFDM-modulated user data to a transmission unit of Transmitter 10 (not shown in FIG. 1), which transmits the user data to radio channels (not shown in FIG. 1).

At the side of Receiver 20, firstly, after a receiving unit of Receiver 20 (not shown in FIG. 1) receives the user data transmitted from Transmitter 10 from radio channels, OFDM Demodulation Unit 21 OFDM-demodulates the received user data and inputs the result, i.e., user data S(0) to HARQ Combining Unit 23 and SNR Estimation Unit 22, respectively. SNR Estimation Unit 22 SNR-estimates the user data S(0) to get estimation values of SNR and variance of SNR, i.e., SNR_est(0) and $\sigma^2_{SNR}(0)$, of the user data S(0). Then SNR_est(0) and $\sigma^2_{SNR}(0)$ are inputted together into HARQ Combining Unit 23. HARQ Combining Unit 23 weights the user data S(0) based on estimated SNR and Variance of SNR, i.e., SNR_est(0) and $\sigma^2_{SNR}(0)$ to get weighted user data R(0), and stores the result, i.e., weighted user data R(0) as final user data in the buffer of HARQ Combining Unit 23. And later, HARQ Combining Unit 23 inputs the user data R(0) to Soft Decoder 24, in which the inputted user data R(0) is soft decoded and outputted to CRC Checking Unit 25. CRC Checking Unit 25 determines whether the user data frames received by Receive 20 are correct and then gets an ACK or NACK indicator accordingly.

If CRC Checking Unit 25 determines the user data received by receiver 20 are correct, CRC Checking Unit 25 will output the user data after CRC checking and issue an ACK indicator, which is fed back respectively to HARQ Combining Unit 23 of Receiver 20 and TX Buffer 12 of Transmitter 10. There should be a certain time delay before HARQ Combining Unit 23 of Receiver 20 and TX Buffer 12 of Transmitter 10 receive the ACK indicator, respectively, so the ACK indicator issued from CRC Checking Unit 25 of Receiver 20 is delayed by Time Delay Unit 26 of Receiver 20 before fed back to HARQ Combining Unit 23 of Receiver 20 and TX Buffer 12 of Transmitter 10, respectively.

When TX Buffer 12 of Transmitter 10 and HARQ Combining Unit 23 of Receiver 20 receive an ACK indicator, the operating procedures for transmitting user data at the side of the transmitter and for receiving user data at the side of the receiver are repeated. That is, TX Buffer 12 of Transmitter 10 gets new user data after CRC appending (in unit of frame), and stores it as final user data. Then the stored user data is transmitted to radio channels (not shown in FIG. 1) via a transmission unit (not shown in FIG. 1) after encoded and OFDM modulated by Transmitter 10. Receiver 20 receives the new user data transmitted by Transmitter 10 from radio channels (not shown in FIG. 1) and processes the received new user data, including OFDM demodulating, SNR estimating and weighting in turn, and at the same time storing weighted new user data as final user data in the buffer of HARQ Combining Unit 23. And later, the stored user data is soft decoded and CRC checked to determine whether the received new user data frames are correct. If the received new user data frames are correct, Receiver 20 outputs the user data after CRC checking and feeds back an ACK indicator to HARQ Combining Unit 23 of Receiver 20 and TX Buffer 12 of Transmitter 10 simultaneously. Thus, all these processes form a loop.

If CRC Checking Unit 25 determines the received user data frames are not correct, CRC Checking Unit 25 of Receiver 20 will issue a NACK indicator. In the same way, the NACK indicator is also delayed by Time Delay Unit 26 and fed back to HARQ Combining Unit 23 of Receiver 20 and TX Buffer 12 of Transmitter 10, respectively.

When HARQ Combining Unit 23 of Receiver 20 and TX Buffer 12 of Transmitter 10 receive a NACK indicator, TX Buffer 12 of Transmitter 10 does not get new user data, and retransmits the stored final user data to Encoder 13 and OFDM Modulation Unit 14 to encode and modulate it. After that, the user data is transmitted to radio channels (not shown in FIG. 1) via the transmission unit (not shown in FIG. 1).

After receiving the user data retransmitted by Transmitter 10 from radio channels (not shown in FIG. 1), Receiver 20 OFDM-demodulates the retransmission user data to get retransmission data S(1) and inputs the retransmission data S(1) into SNR Estimation Unit 22 and HARQ Combining Unit 23, respectively. SNR Estimation Unit 22 SNR-estimates the retransmission data S(1) to get its estimation values of SNR and Variance of SNR, i.e., SNR_est(1) and $\sigma^2_{SNR}(1)$, and inputs the estimated SNR_est(1) and $\sigma^2_{SNR}(1)$ together into HARQ Combining Unit 23. HARQ Combining Unit 23 weights the inputted retransmission data S(1) based on its SNR_est(1) and $\sigma^2_{SNR}(1)$, then gets user data R(1) by combining the weighted retransmission data and final user data S(0) stored in the buffer of HARQ Combining Unit 23, and at the same time stores the combined user data R(1) as final user data in the buffer of HARQ Combining Unit 23.

Then, HARQ Combining Unit 23 inputs the combined user data R(1) into Soft Decoder 24 to decode it. Soft Decoder 24 outputs soft-decoded data to CRC Checking Unit 25 to determine whether the received retransmission user data is correct. If the received retransmission user data is not correct, Receiver 20 feeds back a NACK indicator to HARQ Combining Unit 23 of Receiver 20 and TX Buffer Unit 12 of Transmitter 10, respectively. When HARQ Combining Unit 23 of Receiver 20 and TX Buffer Unit 12 of Transmitter 10 receive the NACK indicator, the operating procedures for retransmitting user data at the side of the transmitter and for receiving retransmitted user data at the side of the receiver are repeated. That is, after encoded and OFDM modulated by Transmitter 10, the final user data in TX Buffer 12 is retransmitted to radio channels (not shown in FIG. 1) via the transmission unit (not shown in FIG. 1). After receiving the user data retransmitted by Transmitter 10 from radio channels (not shown in FIG. 1), Receiver 20 gets retransmission data S(2) by OFDM demodulation, and then gets SNR_est(2) and $\sigma^2_{SNR}(2)$ by SNR-estimating the retransmission data S(2). HARQ Combining Unit 23 weights the inputted retransmission data S(2) based on inputted SNR_est(2) and $\sigma^2_{SNR}(2)$, and then combines the weighted retransmission data with the final user data S(1) in the buffer of HARQ Combining Unit 23 to get user data R(2), which is stored as final user data in the buffer of HARQ Combining Unit 23. And later, R(2) is soft decoded and CRC-checked by Receiver 20 to determine whether the received new retransmission user data is correct. If the received retransmission user data is not correct, Receiver 20 feeds back a NACK indicator respectively to HARQ Combining Unit 23 of Receiver 20 and TX Buffer 12 of Transmitter 10, thus constituting a loop. The loop will go on until the received new retransmission user data is correct. Then Receiver 20 outputs the retransmission user data and feeds back an ACK indicator respectively to HARQ Combining Unit 23 of Receiver 20 and TX Buffer 12 of Transmitter 10 simultaneously.

The above weighted combining process can be realized according to the following formula:

$$\begin{cases} R(i) = \dfrac{\sum\limits_{i=0}^{N_{retrans}} s(i) * \dfrac{SNR\_est(i)}{\sigma_{SNR}(i)}}{\sum\limits_{i=0}^{N_{retrans}} \dfrac{SNR\_est(i)}{\sigma_{SNR}(i)}}, \; SNR\_est(i) < SNR_{threshold} \text{ and } \sigma_{SNR}(i) > \sigma_{threshold} \\ \\ R(i) = \dfrac{\sum\limits_{i=0}^{N_{retrans}} s(i) * SNR\_est(i)}{\sum\limits_{i=0}^{N_{retrans}} SNR\_est(i)}, \; SNR\_est(i) \geq SNR_{threshold} \text{ or } \sigma_{SNR}(i) \leq \sigma_{threshold} \end{cases},$$

Where i indicates the i-th retransmission and $i \geqq 0$;

$N_{retrans}$ indicates the retransmission times of a transmission block, and $1 \leqq N_{retrans} \leqq N_{max}$;

$N_{max}$ indicates the maximum retransmission times of a transmission block;

R(i) indicates the data after the i-th combining;

S(i) indicates the data before the i-th combining;

SNR_est(i) indicates the SNR of the i-th estimation;

$SNR_{threshold}$ indicates the threshold of SNR;

$\sigma^2_{SNR}(i)$ indicates variance of SNR of the i-th estimation;

$\sigma^2_{threshold}$ indicates the threshold of variance of SNR.

According to above detailed description of the embodiment, the HARQ (Hybrid Automatic Repeat Requests) combining method in an OFDM (Orthogonal Frequency Division Multiplexing) System of the present invention can be summarized as the following steps:

a. A transmitter transmits data to a receiver in a unit of frame, then the receiver weights the received data based on its SNR and variance of SNR and stores the weighted data as final data in a buffer of a HARQ combining unit, and later, the receiver processes the stored final data to determine whether the received data frames are correct;

b. If the data frames are correct, the receiver will output the final data and feed back an ACK indicator respectively to the HARQ combining unit of the receiver and the transmitter, and if the data frames are not correct, the receiver will feed back a NACK indicator respectively to the HARQ combining unit of the receiver and the transmitter;

c. When the HARQ combining unit of the receiver and the transmitter receive an ACK indicator, the process returns to step a, until all data has been transmitted;

d. When the HARQ combining unit of the receiver and the transmitter receive a NACK indicator, the transmitter retransmits original data to the receiver, then the HARQ combining unit of the receiver weights the received retransmission data based on its SNR and variance of SNR, and combines the weighted retransmission data with the data stored in the buffer of the HARQ combining unit, and at the same time, stores the combined data as final data in the buffer of the HARQ combining unit, then the receiver processes the combined final data to determine whether the combined data frames are correct, after that, the process returns to Step b.

At the same time, from the above embodiment the receiver in the OFDM system of the present invention will be achieved, which includes:

a SNR estimation unit for SNR-estimating the demodulated data to obtain estimated SNR and variance of SNR and outputting them;

a HARQ combining unit for receiving the output from the SNR estimation unit, weighting inputted demodulated data based on its SNR and variance of SNR, and storing the weighted data as final data in a buffer of said HARQ combining unit, then determining whether to execute the combining based on the determination whether the received data frames are correct: if the received data frames are correct, not executing the combining; if the received data frames are not correct, weighting the inputted demodulated retransmission data based on its SNR and variance of SNR and combining the weighted retransmission data with the data in the buffer of said HARQ combining unit, and at the same time, storing the combined data as final data in the buffer of said HARQ combining unit.

The transmitter and other function modules of the receiver in the OFDM system can be realized by existing technologies. Thus, their description are omitted here.

Herein, in the receiver of the present invention, the process of the HARQ combining unit for weighting the received data and weighted combining the retransmission data based on its SNR and variance of SNR respectively can be realized according to the following formula:

$$\begin{cases} R(i) = \dfrac{\sum_{i=0}^{N_{retrans}} s(i) * \dfrac{SNR\_est(i)}{\sigma_{SNR}(i)}}{\sum_{i=0}^{N_{retrans}} \dfrac{SNR\_est(i)}{\sigma_{SNR}(i)}}, \; SNR\_est(i) < SNR_{threshold} \text{ and } \sigma_{SNR}(i) > \sigma_{threshold} \\ \\ R(i) = \dfrac{\sum_{i=0}^{N_{retrans}} s(i) * SNR\_est(i)}{\sum_{i=0}^{N_{retrans}} SNR\_est(i)}, \; SNR\_est(i) \geq SNR_{threshold} \text{ or } \sigma_{SNR}(i) \leq \sigma_{threshold} \end{cases}$$

Where i indicates the i-th retransmission and $i \geq 0$;

$N_{retrans}$ indicates the retransmission times of a transmission block, and $1 \leq N_{retrans} \leq N_{max}$;

$N_{max}$ indicates the maximum retransmission times of a transmission block;

R(i) indicates the data after the i-th combining;

S(i) indicates the data before the i-th combining;

SNR_est(i) indicates the SNR of the i-th estimation;

$SNR_{threshold}$ indicates the threshold of SNR;

$\sigma^2_{SNR}(i)$ indicates variance of SNR of the i-th estimation;

$\sigma^2_{threshold}$ indicates the threshold of variance of SNR.

Figure 2:
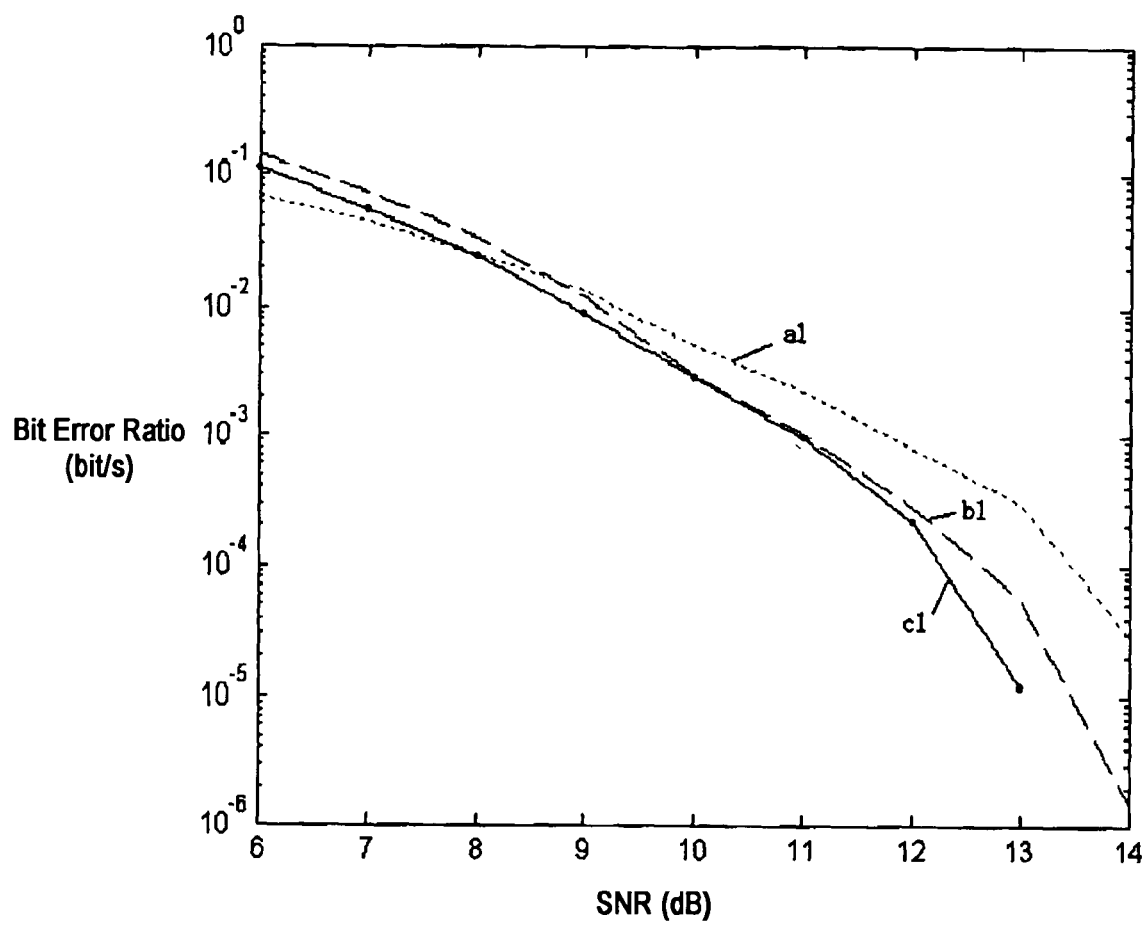
FIG. 2 is a simulation curve chart of SNR-Bit Error Ratio (BER) in which the HARQ combining method of the present invention is compared with normal Chase combining method and non-weighted data combining method.
Figure 3:
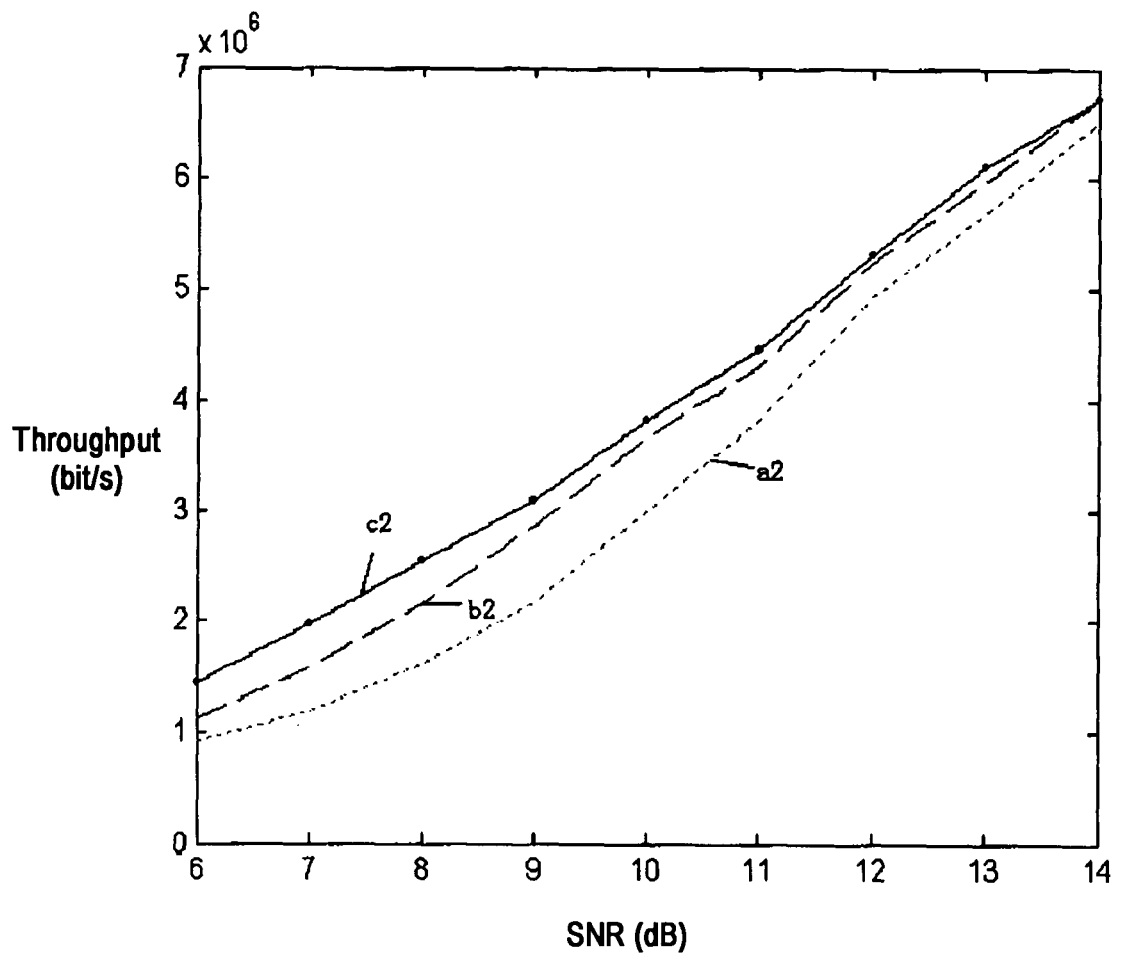
FIG. 3 is a simulation curve chart of SNR-System Throughput in which the HARQ combining method of the present invention is compared with normal Chase combining method and non-weighted data combining method.
Figure 4:
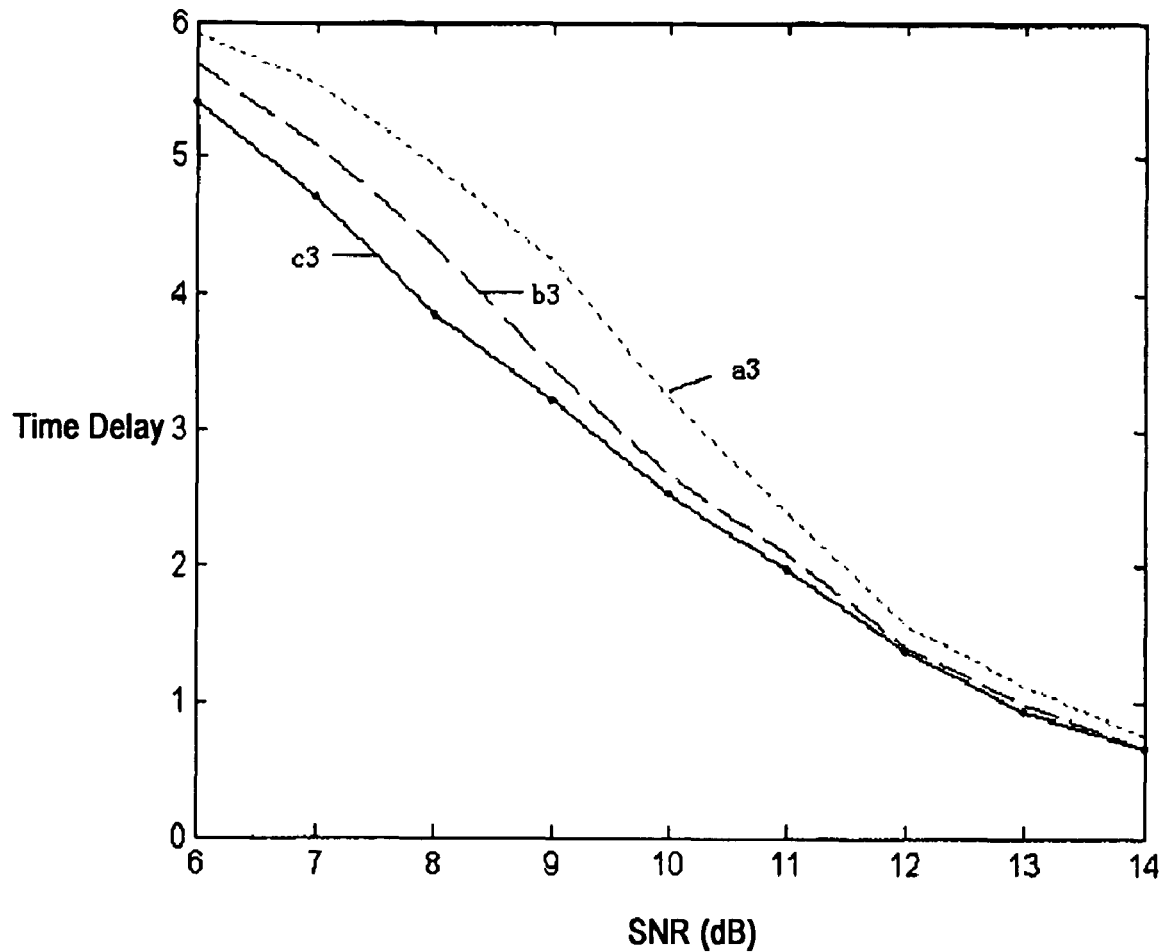
FIG. 4 is a simulation curve chart of SNR-Time Delay in which the HARQ combining method of the present invention is compared with normal Chase combining method and non-weighted data combining method.

FIGS. 2, 3, and 4 show the simulation curve chart of SNR-BER (Bit Error Ratio), SNR-Throughput and SNR-Time Delay according to comparing examples of the present invention, respectively. As show in FIGS. 2-4, curves a1, a2, and a3 indicate the simulation curves when employing non-weighted combining method, curves b1, b2, and b3 indicate the simulation curves when employing normal Chase combining method weighted by SNR, and curves c1, c2, and c3 indicate the simulation curves when employing improved Chase combining method weighted by SNR and variance of SNR of the present invention.

The simulation curves shown in FIGS. 2-4 are obtained in the following simulation environments: in an OFDM system; the carrier frequency is 3.2 GHz; the channel is an outdoor multipath channel A with AWGN+UMTS; the mobile speed is 120 km/h; coding mode is ⅓ Turbo coding; modulation mode is 16QAM; CRC is 24-bit; channel estimation and SNR estimation are ideal; the simulation point is 10240*150; and the maximum retransmission times are set to 5. According to FIGS. 2, 3, and 4, the improved Chase combining method weighted by SNR and variance of SNR of the present invention improves not only the performance of BER, but also system performance in throughput and time delay. And in relatively low SNR (less than 11 dB) environment, the improvement of system performance in throughput and time delay of the method is remarkable. Thus, the improved Chase combining method weighted by SNR and variance of SNR of the present invention has more advantages, particularly in low SNR environment, which is the common condition in mobile communication systems.

As many apparently widely different embodiments of the present invention can be made without departing from the spirit and scope thereof, it is to be understood that the invention is not limited to the specific embodiments thereof except as defined in the appended claims.

As used herein and throughout the claims, the term "variance" means $\sigma^2$, the square of the standard deviation.

What is claimed is:

1. A Hybrid Automatic Repeat Request (HARQ) combining method in an Orthogonal Frequency Division Multiplexing (OFDM) system, comprising steps of:

a. a transmitter transmitting data to a receiver in a unit of frame, then the receiver weighting the received data based on its SNR and variance of SNR and storing the weighted data as final data in a buffer of a HARQ combining unit, and later, the receiver processing the stored final data to determine whether the received data frames are correct;

b. if the data frames are correct, the receiver outputting the final data and feeding back an ACK indicator respectively to the HARQ combining unit of the receiver and the transmitter, and if the data frames are not correct, the receiver feeding back a NACK indicator respectively to the HARQ combining unit of the receiver and the transmitter;

c. when the HARQ combining unit of the receiver and the transmitter receiving an ACK indicator, the process returning to step a, until all data has been transmitted;

d. when the HARQ combining unit of the receiver and the transmitter receiving a NACK indicator, the transmitter retransmitting original data to the receiver, then the HARQ combining unit of the receiver weighting the received retransmission data based on its SNR and variance of SNR, and combining the weighted retransmission data with the data stored in the buffer of the HARQ combining unit, and at the same time, storing the combined data as final data in the buffer of the HARQ combining unit, then the receiver processing the combined final data to determine whether the combined data frames are correct, after that, the process returning to step b.

2. The HARQ combining method according to claim 1, wherein in said step a, before the transmitter transmits data to the receiver in unit of frame, the data needs to undergo processes of CRC appending, coding and OFDM modulating in turn, and at the same time storing the data after CRC appending and before coding as final data in a TX buffer in order to facilitate possible retransmission.

3. The HARQ combining method according to claim 2, wherein in said step a, before the receiver weights the received data based on its SNR and variance of SNR, the receiver has to OFDM-demodulate the received data.

4. The HARQ combining method according to claim 3, wherein in said step a, the receiver processes stored final data including soft decoding and CRC checking in turn, and then obtaining an ACK or NACK indicator based on the determination whether the received data is correct by CRC checking.

5. The HARQ combining method according to claim 1, wherein in said step b, the ACK or NACK indicator fed back to the transmitter is inputted to the TX buffer, and if said TX buffer receives an ACK indicator, it will store new data as final data in itself, and if said TX buffer receives a NACK indicator, it will hold the final data unchanged.

6. The HARQ combining method according to claim 4, wherein in said step d, before the HARQ combining unit of the receiver weights the received retransmission data based on its SNR and variance of SNR, the receiver has to OFDM-demodulate the received retransmission data.

7. The HARQ combining method according to claim 6, wherein in said step d, the SNR and variance of SNR of the retransmission data are obtained by the receiver by SNR-estimating the received OFDM-demodulated retransmission data.

8. The HARQ combining method according to claim 7, wherein in said step d, the receiver processes the combined final data including soft decoding and CRC checking in turn, and then obtaining an ACK or NACK indicator based on the determination whether the combined data frames are correct by CRC checking.

9. A receiver in an OFDM system, comprising:
a SNR estimation unit for SNR-estimating demodulated data to obtain estimated SNR and variance of SNR and outputting them;
a HARQ combining unit for receiving the output from the SNR estimation unit, weighting inputted demodulated data based on inputted SNR and variance of SNR, and storing the weighted data as final data in a buffer of said HARQ combining unit, then determining whether to execute the combining based on the determination whether the received data frames are correct: if the received data frames are correct, not executing the combination; if the received data frames are not correct, weighting the inputted demodulated retransmission data based on its SNR and variance of SNR, combining the weighted retransmission data with the data in the buffer of said HARQ combining unit, and storing the combined data as final data in the buffer of said HARQ combining unit.

10. The HARQ combining method according to claim 1, wherein in step (b), if the data frames are not correct, only said NACK indicator is sent back from the receiver to the transmitter.

11. The HARQ combining method according to claim 1, wherein the process of said Receiver for weighting the received data and weighted combining said retransmission data is implemented according to the following formula:

$$\begin{cases} R(i) = \dfrac{\sum_{i=0}^{N_{retrans}} s(i) * \dfrac{SNR\_est(i)}{\sigma_{SNR}(i)}}{\sum_{i=0}^{N_{retrans}} \dfrac{SNR\_est(i)}{\sigma_{SNR}(i)}}, & SNR\_est(i) < SNR_{threshold} \text{ and } \sigma_{SNR}(i) > \sigma_{threshold} \\[2em] R(i) = \dfrac{\sum_{i=0}^{N_{retrans}} s(i) * SNR\_est(i)}{\sum_{i=0}^{N_{retrans}} SNR\_est(i)}, & SNR\_est(i) \geq SNR_{threshold} \text{ or } \sigma_{SNR}(i) \leq \sigma_{threshold} \end{cases}$$

where i indicates the i-th retransmission, and $i \leq 0$;

$N_{retrans}$ indicates the retransmission times of a transmission block, and $1 \leq N_{retrans} \leq N_{max}$;

$N_{max}$ indicates the maximum retransmission times of a transmission block;

R(i) indicates the data after the i-th combining;

S(i) indicates the data before the i-th combing;

SNR_est(i) indicates the SNR of the i-th estimation;

$SNR_{threshold}$ indicates the threshold of SNR;

$\sigma^2_{SNR}(i)$ indicates variance of SNR of the i-th estimation;

$\sigma^2_{threshold}$ indicates the threshold of variance of SNR.

12. The receiver according to claim 9, wherein the processes for weighting the demodulated data and weighted combining said inputted demodulated retransmission data is implemented according to the following formula:

$$\begin{cases} R(i) = \dfrac{\sum_{i=0}^{N_{retrans}} s(i) * \dfrac{SNR\_est(i)}{\sigma_{SNR}(i)}}{\sum_{i=0}^{N_{retrans}} \dfrac{SNR\_est(i)}{\sigma_{SNR}(i)}}, & SNR\_est(i) < SNR_{threshold} \text{ and } \sigma_{SNR}(i) > \sigma_{threshold} \\ \\ R(i) = \dfrac{\sum_{i=0}^{N_{retrans}} s(i) * SNR\_est(i)}{\sum_{i=0}^{N_{retrans}} SNR\_est(i)}, & SNR\_est(i) \geq SNR_{threshold} \text{ or } \sigma_{SNR}(i) \leq \sigma_{threshold} \end{cases}$$

where i indicates the i-th retransmission, and $i \geq 0$;

$N_{retrans}$ indicates the retransmission times of a transmission block, and $1 \leq N_{retrans} \leq N_{max}$;

$N_{max}$ indicates the maximum retransmission times of a transmission block;

R(i) indicates the data after the i-th combining;

S(i) indicates the data before the i-th combining;

SNR_est(i) indicates the SNR of the i-th estimation;

$SNR_{threshold}$ indicates the threshold of SNR;

$\sigma^2_{SNR}(i)$ indicates the variance of SNR of the i-th estimation;

$\sigma^2_{threshold}$ indicates the threshold of Variance of SNR.

* * * * *